May 23, 1933.  A. CHURCHWARD  1,910,825

WELDING GENERATOR

Filed Feb. 7, 1930

INVENTOR
Alexander Churchward
BY
Williams, Rich & Lumee
ATTORNEYS

Patented May 23, 1933

1,910,825

UNITED STATES PATENT OFFICE

ALEXANDER CHURCHWARD, OF SOUTH ORANGE, NEW JERSEY, ASSIGNOR TO WILSON WELDER & METALS COMPANY, INC., OF HOBOKEN, NEW JERSEY, A CORPORATION OF NEW YORK

WELDING GENERATOR

Application filed February 7, 1930. Serial No. 426,463.

The present invention relates to arc welding apparatus.

It is well known to those skilled in the art of electric arc welding that the desirable features of a direct current welding generator are high open circuit or "striking" voltage, and a drooping characteristic voltage curve to minimize the losses inherent in producing the proper voltage across the arc and proper welding current value. The ordinary shunt generator has a drooping characteristic, but is totally unsuitable for use in a welding apparatus for the reason that its voltage drops to zero on short circuit and is very slow to build up to its normal open circuit voltage upon removal of short circuit, it being noted that, under actual welding conditions, momentary short circuits are produced, at the rate of from thirty to fifty per second, as revealed by the oscillograph. Thus, generators having constant-voltage-producing fields have been widely used in welding circuits. Such a field, if separately excited from an independent source of energy, calls for an additional small generator, or if electrically combined with the welding generator itself, an extra set of brushes on the commutator or a bipolar armature in a four pole field is required. Generators equipped with constant-voltage-producing fields give the required high open circuit voltage, but to obtain a lowering of their voltage under load a bucking series field is generally used, and if not equipped with such series field, the losses involved in their operation in arc welding circuits are evidently very high.

The general object of the present invention is to provide an improved shunt generator which may be effectively used for supplying current to a welding circuit.

Figure 1:
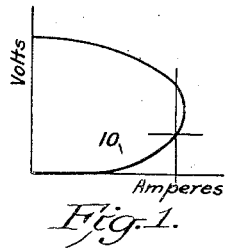
Figure 2:
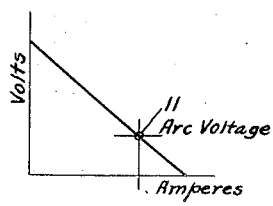
Figure 3:
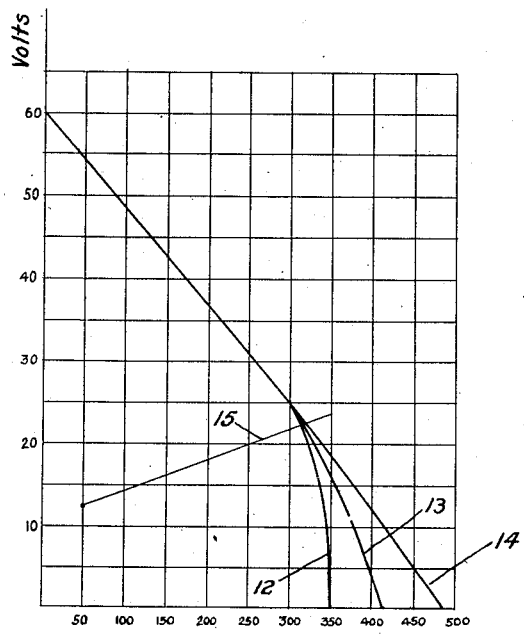

The invention will be understood from the following description, taken in connection with the accompanying drawing in which Fig. 1 shows the characteristic of an ordinary shunt generator; Fig. 2 shows the ideal characteristic of a welding generator; Fig. 3 shows the characteristics of a shunt generator made in accordance with the invention, and Figs. 4 to 11 inclusive illustrate in schematic form a welding apparatus and circuit embodying the invention, and various arrangements of the resistance providing various selected welding current values.

As is well known in the electrical art, the characteristic of an ordinary shunt generator has a lower portion, as represented by the numeral 10 in Figure 1, which corresponds to the unstable state of such generator when a decrease in resistance in a circuit supplied by such generator causes the shunt field magnets to lose their magnetism.

Since a great number of momentary short circuits occur at the work in ordinary welding operations, and inasmuch as an ordinary shunt generator is slow to pick up its voltage from short circuit, it is obvious that such a generator is totally unsuitable for use in a welding apparatus. Moreover, the large decrease of current on short circuit, if the use of a shunt generator were possible, would be detrimental to the making of good welds.

In an ideal welding machine, the voltage should decrease substantially proportionally as the current increases, and the current should never fall below but preferably rise above that value used under normal length of arc, said value being represented by the point 11 in Fig. 2.

Figure 4:
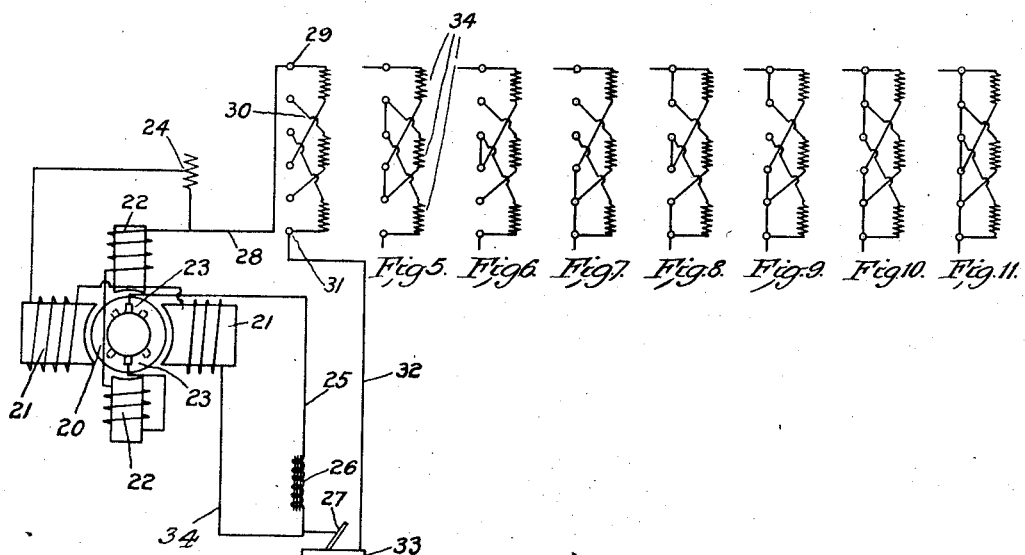

In accordance with the invention, there is provided a welding generator of the shunt or self excited type, which is small, low in cost of manufacture and very efficient in that it closely approximates the ideal characteristic referred to. Referring to Fig. 4, an armature 20, having the least number of conductors possible, is employed. A strong shunt field 21, 21 and heavy commutating poles or interpoles 22, 22 are also employed. By using an armature that has the least number of conductors possible, its distorting effect on the field is reduced to a minimum, this feature alone improving the regulation of the generator and tending to straighten out its characteristic. By reason of the strength of the interpole field, there is a compounding effect produced between the interpole field and the shunt field, which two fields, with armature reaction minimized, are thus capable together of providing the required flux in the magnetic structure of the generator from open-circuit to short-circuit conditions and hence an increase of current with decrease of voltage from open-circuit to short-circuit conditions. Also, by using heavy commutating poles and an armature that has a small distorting effect, a small commutator and very low contact resistance brushes are possible; and moreover the commutator and the armature winding, instead of rising to the allowable temperature limits of 65° C. and 50° C., respectively, rise only to from 40° to 45° C., and to from 48° C. to 50° C., respectively. The actual weight of a generator having the above-mentioned design features, may be 50 to 60 percent of that of other machines of equal capacity.

I have found that a machine constructed in the manner described provides a characteristic that very closely approaches the ideal curve of Fig. 2, the current on short circuit never falling below the welding current value under normal length of arc. I have also found that by varying the position of the brushes 23, 23 on the commutator with relation to the interpoles 22, 22, the portion of the curve below the voltage value corresponding to welding current under normal length of arc may be varied considerably, so that a desired increase of current on short-circuit may be obtained by suitably positioning the brushes 23, 23 on the commutator. Thus, in Fig. 3, curve 13 is the characteristic of a shunt generator having the above-mentioned design features, with the brushes 23, 23 in the mechanical and electrical neutral position. Curve 14 is a characteristic of such generator, when the brushes 23, 23 are moved in a counter-direction with respect to the direction of rotation of the armature to a given position; for such positioning of the brushes 23, 23, an increase of current on short circuit as much as 50 percent of the welding current under normal length of arc is possible, without sparking at the commutator. Curve 12 is a characteristic of such generator, when the brushes 23, 23 are placed in advance of the neutral position with relation to the direction of rotation; for such positioning of the brushes 23, 23, the current may be substantially the same on short-circuit as the current under normal length of arc.

As an illustration of the advantages with respect to size and over-all efficiency of a shunt generator made in accordance with this invention, the machine giving the curves of Fig. 3 has a two-path series wound armature in a four-pole field and provides a normal open circuit voltage of 60 with a maximum welding current capacity of 300 amperes and a welding current range of from 75 to 300 amperes, the commutator and the armature being 6 inches and 7 inches in diameter respectively. With a $\frac{3}{4}$ inch arc of contact of the brushes with the commutator and with interpoles $\frac{3}{4}$ inch wide, the placement of the brushes on the commutator giving the characteristics 12, 13 and 14 are respectively $\frac{1}{16}$ inch in advance of neutral position, neutral position, and $\frac{1}{16}$ inch back of neutral position, sparkless commutation being possible without any undue heating of the commutator when the brushes are at any of the three positions. The armature has 71 turns, the commutator has 71 bars or segments, the shunt field has 400 turns per coil or 1600 total turns, and the inter-poles have 13 turns per coil or 52 total turns. The armature ampere turns, when welding at the maximum current value of 300 amperes, are $150 \times 71$ or 10,650 and the interpole ampere-turns are $52 \times 300$ or 15,600. On open circuit, the shunt field ampere turns, with 8 amperes through said field, are $1600 \times 8$ or 12,800, and when welding at full load, with 2 amperes through same, $1600 \times 2$ or 3200. The total field ampere turns, when welding at full load, cooperating with the 10,650 armature ampere-turns are therefore $3200 + 15,600$ or 18,800. The generator described is designed for arc welding with metallic electrodes calling for an arc voltage of approximately 20 volts.

A feature of the generator described is that, once the brushes are set, they do not have to be moved for different operating current values, as is generally the case in present machines. Thus, the welding current value may be controlled by adjusting the value of the open circuit voltage, for instance by the rheostat 24 in series with the shunt field windings, (i e. the higher the open circuit voltage for which the machine is set, the higher the welding current); and the brushes 23, 23 set for a desired increase of current on short circuit for a particular welding current value under normal length of arc, also provide the desired increase of current on short circuit for any other operating welding current value, without need of repositioning them on the commutator.

Since in general a high "striking" voltage is required, it is more desirable to vary the operating current value by means other than by the variation of the open circuit voltage. The welding generator herein described makes possible the use of a variable resistance in the welding circuit to obtain a variation of the operating current value below the full load value, with the total output of the generator at any operating current value being never substantially greater than or comparing in magnitude with its output at full load.

The insertion of a variable resistance in the welding circuit to vary the operating welding current is illustrated in Fig. 4. One terminal of the generator leading from a brush 23 is connected by means of a conductor 25 through the usual reactance unit 26 to the electrode 27. The other terminal of the generator leading from the interpole windings 22 in series with the other brush is connected by the conductor 28 to one terminal 29 of the variable resistance unit 30. The other terminal 31 of the latter is connected by a conductor 32 to the work 33. In the embodiment of the invention shown in the drawing, one terminal of the shunt field is connected to the electrode 27 by the conductor 34, and the other terminal of the shunt field is connected through the field rheostat 24 to the terminal of the generator connected by the conductor 28 to the variable resistance unit 30.

To obtain the various resistance values required for the various operating current values, I preferably utilize three resistance elements 34 adapted to be electrically connected in a plurality of ways by means of a manually operated controller or rotary switch (not shown in the drawing). Thus, in Figure 4, the resistance elements are all open circuited; in Figure 5, they are all placed in series with the welding circuit; in Figure 6, two of the resistance elements are placed in series with the welding circuit with the remaining element open circuited; in Figure 7, only one element is connected in series with the welding circuit with the two remaining elements open circuited; in Figure 8, two of the resistance elements are placed in series with the remaining element in parallel therewith; in Figure 9, two elements are placed in parallel with one another with the third open circuited; in Figure 10, all three elements are placed in parallel; and in Figure 11, all three resistance elements are short circuited.

Thus, there are eight useful positions of the resistance controller, one position corresponding to the connections of Figure 4 interrupting the current in the welding circuit, six positions corresponding to Figures 5 to 10 inclusive giving six particular values of resistance in the welding circuit and hence six corresponding values of welding current, and the eighth position corresponding to Figure 11 serving to provide the full load current value.

The method of varying the resistance in the welding circuit described herein is advantageous in that it does not concentrate the heat produced on any part when operating near full load current. The resistance unit may be made small and compact, and is preferably placed below the generator so that the forced draught from the latter materially assists in keeping it cool.

As an illustration of the low losses involved in the use of a variable resistance for obtaining desired current variations in a welding circuit supplied with current from a generator having the constructional features described herein, the total output of the generator at various welding current values will be compared to that at full load value. Referring to Figure 3, curve 15 illustrates the values of voltage required across the arc at different welding current values. The full load welding current is 300 amperes, and the voltages across the generator and across the arc at said full load welding current are, respectively, 25 volts and 22 volts, the difference between the 25 volts across the generator and the 22 volts across the arc being taken up by the reactance unit 26. Thus, the generator output at full load welding current is 300 × 25 watts or 7.5 k.w. It is noted from either characteristics 12, 13 or 14 that, with an open circuit voltage of 60 volts, a 250 ampere welding current value occurs at a generator voltage of 31 volts; therefore, by inserting in the welding circuit such a resistance as will provide the 20 volts required across the arc at said 250 amperes welding current value, the machine will then weld at 250 amperes with a total output from the generator of 250 × 31 watts or 7.8 k.w., which is substantially the same as 7.5 k.w., the output when delivering the full load current value of 300 amperes with no resistance in circuit. A greater value of resistance in the welding circuit may provide a current of 200 amperes, with the open circuit voltage of the generator again adjusted to 60 volts; the generator voltage when welding at 200 amperes is 37 volts and thus the output of the generator when welding at 200 amperes is 200 × 37 watts or 7.4 k.w. Again when welding at 150 amperes with a still greater value of resistance in the welding circuit, the generator output is 150 × 42 watts or 6.3 k.w. Evidently, a variable resistance unit 30 may provide any number of fixed current steps, and any current value between the fixed current steps may be obtained by varying the open circuit voltage by means of the shunt field rheostat 24.

The use of a variable resistance in a welding circuit supplied by the welding generator described gives the current regulation which may be obtained in constant potential machines without the excessive power losses involved. For example, a machine having a constant potential of 60 volts when welding at 250 amperes has a total output of 250×60 or 15 k. w., whereas the shunt generator described herein has the same striking voltage of 60 which drops to 31 volts when welding at 250 amperes and its output is then only 7.8 k. w. When welding at full load (300 amperes), a constant potential machine would have to provide 300×60 or 18 k. w. as compared to the 7.5 k. w. output of the shunt generator described.

From the above it becomes apparent to those skilled in the art that I have provided a shunt or self-excited generator which is well adapted for use in supplying current to a welding circuit for the reason that high open circuit or "striking" voltage and an increase of current with decrease of voltage from open circuit to welding conditions are obtained. Any desired increase of current on short circuit, within wide limits, is also obtained, a single setting of the brushes on the commutator providing the desired increase of current on short-circuit for any particular operating value of welding current. The use of a variable resistance in a welding circuit supplied with current by this generator makes possible a desired range of welding current values with small losses involved. When welding at a full load current, the power output of the driving motor, allowing for friction and resistance losses in the generator per se, is not very much greater than the power consumed at the arc when welding at said full load current. When welding at any other welding current, the power output of the driving motor is never substantially greater than that at full load. Thus, the driving motor may be designed to provide for the full load welding current and need not be over-loaded at any other welding current.

What is claimed is:

1. A direct current welding generator for supplying current to a welding circuit having an armature, a commutator, a magnetic structure having main pole and interpole pieces, brushes corresponding in number only to the number of said main pole pieces and engaging said commutator in substantial alinement with said interpole pieces, shunt field windings on said main pole pieces and connected to said brushes for excitation therefrom, and interpole field windings on said interpole pieces and connected in series with the welding circuit; said armature being characterized by the fact that it produces a weak magnetic field, and said main pole and interpole pieces and windings thereon being characterized by the fact that they produce strong magnetic fields; whereby said main pole and interpole pieces and windings thereon cooperate to provide the flux required from open-circuit to short-circuit conditions to bring about an increase of current with decrease of voltage from open-circuit to short-circuit conditions.

2. A direct current welding generator for supplying current to a welding circuit having an armature, a commutator, a magnetic structure having main pole and interpole pieces, adjustable brushes corresponding in number only to the number of said main pole pieces and engaging said commutator in substantial alinement with said interpole pieces, shunt field windings on said main pole pieces and connected to said brushes for excitation therefrom, and interpole field windings on said interpole pieces and connected in series with the welding circuit; said armature being characterized by the fact that it produces a weak magnetic field, and said main pole and interpole pieces and windings thereon being characterized by the fact that they produce strong magnetic fields; whereby said main pole and interpole pieces and windings thereon cooperate to provide the flux required from open-circuit to short-circuit conditions to bring about an increase of current with decrease of voltage from open-circuit to short-circuit conditions, and to permit the current in the welding circuit at short-circuit conditions to be varied by an adjustment of the position of said brushes relatively to the interpole field windings.

In testimony whereof, I have affixed my signature to this specification.

ALEXANDER CHURCHWARD.